(12) United States Patent
Lai (10) Patent No.: US 9,152,255 B2
(45) Date of Patent: Oct. 6, 2015

(54) MANAGEMENT AND APPLICATION METHODS AND SYSTEMS FOR TOUCH-SENSITIVE DEVICES, AND COMPUTER PROGRAM PRODUCTS THEREOF

(75) Inventor: Ming-Te Lai, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 854 days.

(21) Appl. No.: 13/099,861

(22) Filed: May 3, 2011

(65) Prior Publication Data

US 2012/0280933 A1 Nov. 8, 2012

(51) Int. Cl.
*G06F 3/044* (2006.01)
*G06F 3/041* (2006.01)
*G06F 1/32* (2006.01)

(52) U.S. Cl.
CPC .............. *G06F 3/041* (2013.01); *G06F 1/3231* (2013.01); *G06F 1/3265* (2013.01); *G06F 3/044* (2013.01); *Y02B 60/1242* (2013.01); *Y02B 60/1289* (2013.01)

(58) Field of Classification Search
CPC ............ G06F 3/041; G06F 3/044; G08B 6/00
USPC ........................ 345/174, 173, 175; 178/18.03; 340/407.2
See application file for complete search history.

(56) References Cited

U.S. PATENT DOCUMENTS

| 8,085,251 | B2 * | 12/2011 | Harada et al. ................. 345/173 |
| 8,338,723 | B2 * | 12/2012 | Kim ............................. 178/18.03 |
| 2008/0122798 | A1 | 5/2008 | Koshiyama et al. |
| 2008/0278450 | A1 * | 11/2008 | Lashina ......................... 345/173 |
| 2008/0284738 | A1 | 11/2008 | Hovden et al. |
| 2009/0189867 | A1 | 7/2009 | Krah et al. |
| 2009/0207154 | A1 * | 8/2009 | Chino ........................... 345/175 |
| 2011/0037576 | A1 * | 2/2011 | Jeon et al. .................... 340/407.2 |
| 2011/0043483 | A1 | 2/2011 | Mizuhashi et al. |

FOREIGN PATENT DOCUMENTS

| CN | 101515213 A | 8/2009 |
| CN | 101702106 A | 5/2010 |
| CN | 101952792 A | 1/2011 |

(Continued)

*Primary Examiner* — Quan-Zhen Wang
*Assistant Examiner* — Yuk Chow
(74) *Attorney, Agent, or Firm* — Birch, Stewart, Kolasch & Birch, LLP (57) ABSTRACT

Management and application methods and systems for an electronic apparatus having touch-sensitive devices are provided. First, at least one sensing electrode of a touch-sensitive device is scanned. It is determined whether a sensed value corresponding to the sensing electrode is greater than a first threshold value and whether the sensed value corresponding to the sensing electrode is greater than a second threshold value, wherein the second threshold value is greater than the first threshold value. When the sensed value is greater than the first threshold value, and is not greater than the second threshold value, it is determined that a first event is detected by the touch-sensitive device, for example, an object is close to the touch-sensitive device. When the sensed value is greater than the second threshold value, it is determined that a second event is detected by the touch-sensitive device, for example, the touch-sensitive device is touched by the object.

6 Claims, 5 Drawing Sheets

(56) References Cited

FOREIGN PATENT DOCUMENTS

| | | |
|---|---|---|
| CN | 102239466 A | 11/2011 |
| EP | 2 330 486 A1 | 6/2011 |
| JP | 2008-117371 A | 5/2008 |
| TW | 201020891 A | 6/2010 |
| WO | WO 2008/007372 A2 | 1/2008 |
| WO | WO 2009/067224 A1 | 5/2009 |
| WO | WO 2010/089980 A1 | 8/2010 |

* cited by examiner

MANAGEMENT AND APPLICATION METHODS AND SYSTEMS FOR TOUCH-SENSITIVE DEVICES, AND COMPUTER PROGRAM PRODUCTS THEREOF

BACKGROUND OF THE INVENTION

1. Field of the Invention

The disclosure relates to management and application methods and systems for an electronic apparatus having a touch-sensitive device, and more particularly to a method and system for providing an adjacency approaching function in an electronic apparatus having a touch-sensitive device.

2. Description of the Related Art

Recently, to provide convenient and friendly operations for users, an electronic apparatus is usually equipped with a touch-sensitive device. Through the touch-sensitive device, users can directly perform corresponding operations, such as application programs and inputting of data.

Currently, a capacitive touch-sensitive device is adopted by many electric apparatuses. In general, electrodes of a capacitive touch-sensitive panel are arranged in a crisscross pattern, and capacitance variations between the electrodes can be sensed. It is known that a human body is a conductor. Thus, when a human body is close to the electrodes, the capacitance between a finger of the human body and the electrodes is increased. Accordingly, the specific position touched on the capacitive touch-sensitive panel can be detected by determining capacitance of which sensor trace is increased.

In prior arts, an electronic apparatus having a touch-sensitive device provides only one touch function. In other words, the electronic apparatus only determines whether one object touches the touch-sensitive device for applications. However, in some events, in addition to the touch function of determining whether one object touches the touch-sensitive device, the electrode apparatus may have some applications/and requirements for detecting objects which approach the touch-sensitive device. When required of the electronic apparatus, the electronic apparatus must be equipped with an approaching detector to detect whether an object is close to the electronic apparatus. The disposition of the related elements causes an increase of the cost of the electronic apparatus. Meanwhile, the resources of the electronic apparatus, such as its power source, are limited. Additional power is required to perform operations of the related elements.

BRIEF SUMMARY OF THE INVENTION

An exemplary embodiment of a management and application method for an electronic apparatus having a touch-sensitive device is provided. First, at least one sensing electrode of the touch-sensitive device is scanned to obtain a sensed value corresponding to the sensing electrode. It is determined whether the sensed value is greater than a first threshold value, and it is determined whether the sensed value is greater than a second threshold value. The second threshold value is greater than the first threshold value. When the sensed value is greater than the first threshold value and is not greater than the second threshold value, it is determined that a first event is detected by the touch-sensitive device. When the sensed value is greater than the second threshold value, it is determined that a second event is detected by the touch-sensitive device.

An exemplary embodiment of a management and application system for an electronic apparatus comprises a touch-sensitive device and a processing unit. The touch-sensitive device has at least one sensing electrode. The processing unit scans the sensing electrode of the touch-sensitive device to obtain a sensed value corresponding to the sensing electrode. The processing unit determines whether the sensed value is greater than a first threshold value and determines whether the sensed value is greater than a second threshold value. The second threshold value is greater than the first threshold value. When the sensed value is greater than the first threshold value and is not greater than the second threshold value, the processing unit determines that a first event is detected by the touch-sensitive device. When the sensed value is greater than the second threshold value, the processing unit determines that a second event is detected by the touch-sensitive device.

In some embodiments, the processing unit scans the sensing electrode of the touch-sensitive device with a first frequency, and when the sensed value corresponding to the sensing electrode is greater than the first threshold value, the processing unit scans the sensing electrode of the touch-sensitive device with a second frequency. The second frequency is greater than the first frequency.

In some other embodiments, when the first event is detected by the touch-sensitive device, the processing unit further executes at least one first application corresponding to the first event. When the second event is detected by the touch-sensitive device, the processing unit further executes at least one second application corresponding to the second event.

In some embodiments, the first event indicates that an object is close to the touch-sensitive device with a distance shorter than a predetermined distance. The second event indicates that the object touches the touch-sensitive device.

Another exemplary embodiment of a management and application method for an electronic apparatus having a touch-sensitive device is provided. First, at least one sensing electrode of the touch-sensitive device is scanned to obtain a sensed value corresponding to the sensing electrode. The touch-sensitive device is a capacitive touch-sensitive unit, and the sensed value is a capacitance. Then, it is determined whether an object is close to or touches the touch-sensitive device according to the capacitance.

Another exemplary embodiment of a management and application system for an electronic apparatus comprises a touch-sensitive device and a processing unit. The touch-sensitive device has at least one sensing electrode. The processing unit scans the sensing electrode of the touch-sensitive device to obtain a sensed value corresponding to the sensing electrode. The touch-sensitive device is a capacitive touch-sensitive unit, and the sensed value is a capacitance. Then, the processing unit determines whether an object is close to or touches the touch-sensitive device according to the capacitance.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Management and application systems for an electronic apparatus having touch-sensitive devices are provided. In an exemplary embodiment of a management and application system for an electronic apparatus having a touch-sensitive device in FIG. 1, a management and application system 100 may be configured in an electronic apparatus, such as a computer, a personal digital assistant, a smart phone, a mobile phone, a mobile internet device (MID), a tablet PC, or a netbook.

Figure 1:
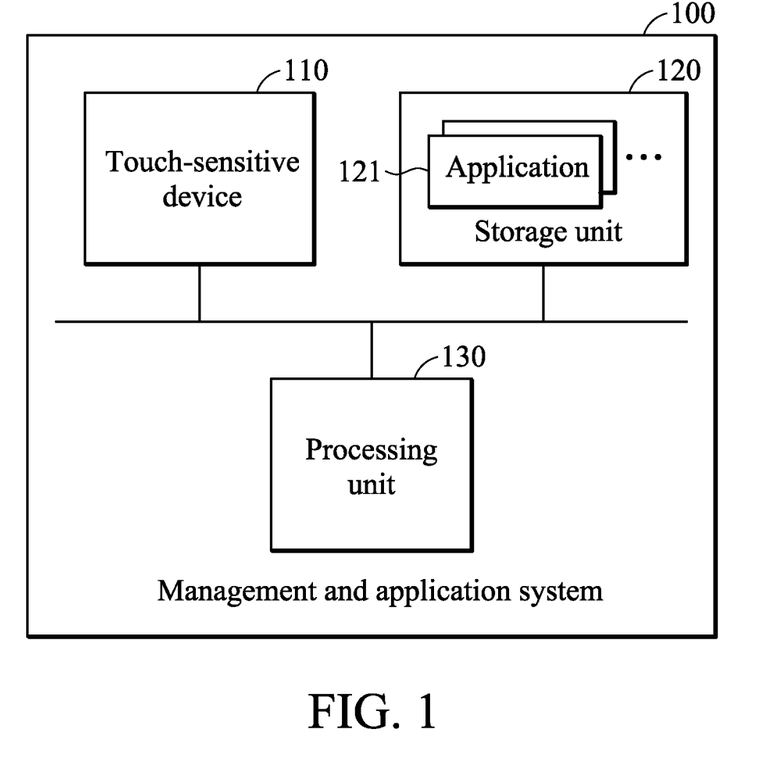
FIG. 1 shows an exemplary embodiment of a management and application system for an electronic apparatus having a touch-sensitive device.

The management and application system 100 for an electronic apparatus having a touch-sensitive device at least comprises a touch-sensitive device 110, a storage unit 120, and a processing unit 130. In some embodiments, the touch-sensitive device 110 may be a capacitive touch-sensitive unit, such as a projected capacitive touch-sensitive unit or a surface capacitive touch-sensitive unit. Electrodes of the touch-sensitive device 110 are arranged in a crisscross pattern, and capacitance variation between the electrodes can be sensed. The touch-sensitive device 110 has a plurality of sensing electrodes, and a sensed value (such as a capacitance) of each sensing electrode can be sensed. In the embodiment, the sensing electrodes of the touch-sensitive device 110 may be a plurality of sensor traces. A sensed value corresponding to each sensor trace varies according to whether an object, such as a conductive finger, is close to or touches the touch-sensitive device 110. Note that, in some embodiments, the management and application system 100 may determine the mode of the electronic apparatus according to the sensed value corresponding to each sensor trace. The storage unit 120 stores related applications and/or parameters corresponding to each mode of the electronic apparatus. The processing unit 130 is used to perform a management and application method disclosed in the present disclosure. The detailed description is shown in the following.

Figure 2:
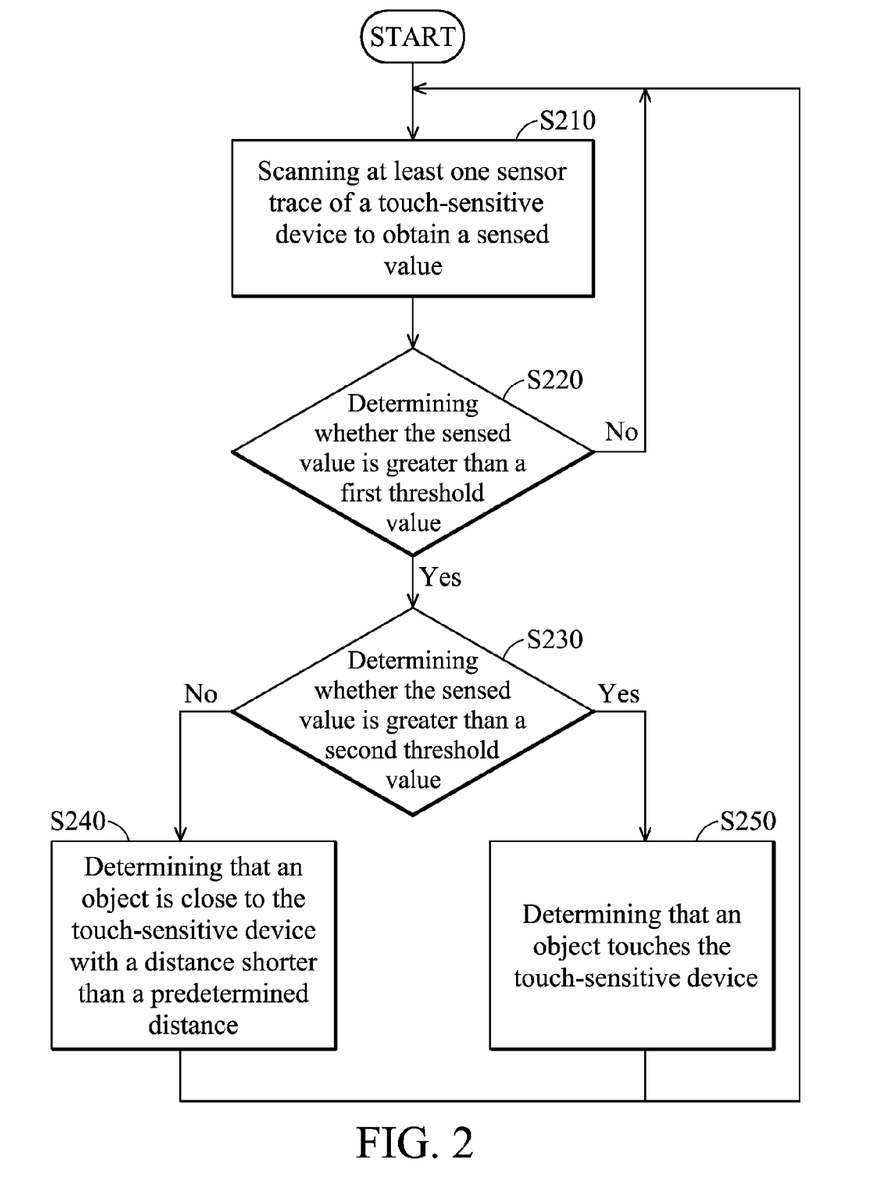
FIG. 2 is a flow chart of an exemplary embodiment of a management and application method for an electronic apparatus having a touch-sensitive device.

FIG. 2 is a flow chart of an exemplary embodiment of a management and application method for an electronic apparatus having a touch-sensitive device. The management and application method of the embodiment may be applied in an electronic apparatus having a touch-sensitive device, such as a computer, a personal digital assistant, a smart phone, a mobile phone, a mobile internet device (MID), a tablet PC, or a netbook. In the embodiment, whether an object is close to or touches the touch-sensitive device can be determined according to the sensed value corresponding to each sensor trace.

In the step S210, at least one sensor trace of the touch-sensitive device is scanned to obtain a sensed value corresponding to the sensor trace. In some embodiments, the touch-sensitive device may be a capacitive touch-sensitive unit, such as a projected capacitance touch-sensitive unit or a surface capacitive touch-sensitive unit, and the sensed value is a capacitance. In the step S220, it is determined whether the sensed value corresponding to the sensor trace is greater than a first threshold value. When the sensed value corresponding to the sensor trace is not greater than the first threshold value ("No" of the step S220), the method proceeds back to the step S210. When the sensed value corresponding to the sensor trace is greater than the first threshold value ("Yes" of the step S220), it is determined whether the sensed value corresponding to the sensor trace is greater than a second threshold value, as shown in the step S230. Note that, the second threshold value is greater than the first threshold value. When the sensed value corresponding to the sensor trace is not greater than the second threshold value ("No" of the step S230), it is determined that an object, such as a finger or any conductor, is close to the touch-sensitive device with a distance shorter than a predetermined distance, as shown in the step S240. When the sensed value corresponding to the sensor trace is greater than the second threshold value ("Yes" of the step S230), in the step S250, it is determined that an object, such as a finger or any conductor, touches the touch-sensitive device.

Figure 3:
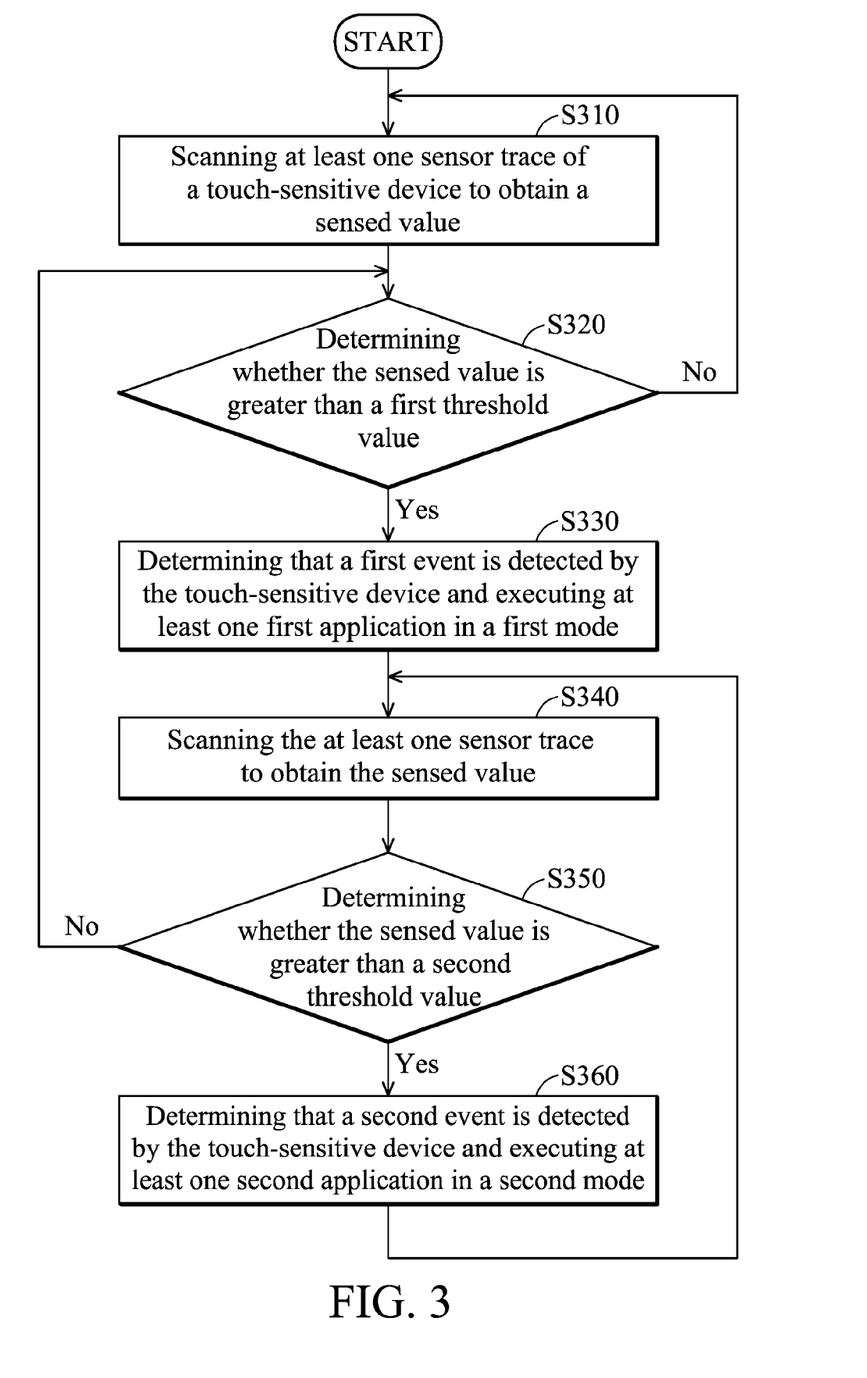
FIG. 3 is a flow chart of another exemplary embodiment of a management and application method for an electronic apparatus having a touch-sensitive device.

FIG. 3 is a flow chart of another exemplary embodiment of a management and application method for an electronic apparatus having a touch-sensitive device. The management and application method of the embodiment can be applied in an electronic apparatus having a touch-sensitive device, such as a computer, a personal digital assistant, a smart phone, a mobile phone, a mobile internet device (MID), a tablet PC, or a netbook. In the embodiment, an operation mode of the electronic apparatus can be determined according to the sensed value corresponding to each sensor trace, and applications corresponding to the operation mode are provided.

In the step S310, at least one sensor trace of the touch-sensitive device is scanned to obtain a sensed value corresponding to the sensor trace. Similarly, in some embodiments, the touch-sensitive device may be a capacitive touch-sensitive unit, such as a projected capacitive touch-sensitive unit or a surface capacitive touch-sensitive unit, and the sensed value is a capacitance. In the step S320, it is determined whether the sensed value corresponding to the sensor trace is greater than a first threshold value. When the sensed value corresponding to the sensor trace is not greater than the first threshold value ("No" of the step S320), the method proceeds back to the step S310. When the sensed value corresponding to the sensor trace is greater than the first threshold value ("Yes" of the step S320), it is determined that a first event is detected by the touch-sensitive device, and at least one first application in a first mode corresponding to the first event is executed, as shown in the step S330. Note that, in some embodiments, the first event indicates that an object, such as a finger or any conductor, is close to the touch-sensitive device with a distance shorter than a predetermined distance. In the step S340, the sensor trace of the touch-sensitive device is scanned continuously to obtain the sensed value corresponding to the sensor trace. In the step S350, it is determined whether the sensed value corresponding to the sensor trace is greater than a second threshold value. The second threshold value is greater than the first threshold value. When the sensed value corresponding to the sensor trace is not greater than the second threshold value ("No" of the step S350), the method proceeds back to the step S320. When the sensed value corresponding to the sensor trace is greater than the second threshold value ("Yes" of the step S350), it is determined that a second event is detected by the touch-sensitive device, and at least one second application in a second mode corresponding to the second event is executed, as shown in the step S360. Note that, in some embodiments, the second event indicates that an object, such as a finger or any conductor, touches the touch-sensitive device. Afterward, the method proceeds back to the step S340 to continuously scan the sensor trace of the touch-sensitive device to obtain the sensed value corresponding to the sensor trace. Then, the determination of the step S350 is performed.

Figure 4:
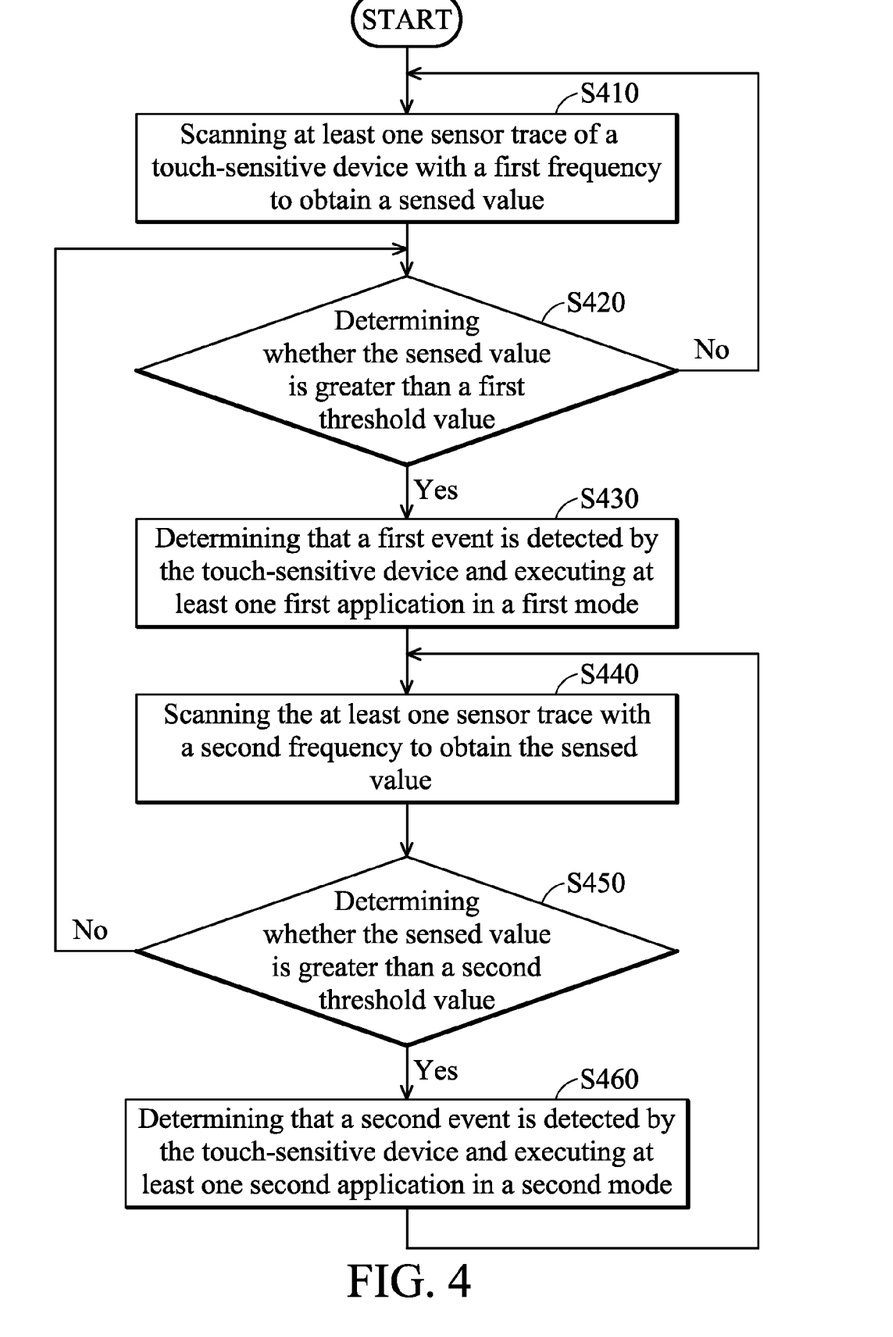
FIG. 4 is a flow chart of further another exemplary embodiment of a management and application method for an electronic apparatus having a touch-sensitive device.

FIG. 4 is a flow chart of further another exemplary embodiment of a management and application method for an electronic apparatus having a touch-sensitive device. The management and application method of the embodiment may be applied in an electronic apparatus having a touch-sensitive device, such as a computer, a personal digital assistant, a smart phone, a mobile phone, a mobile internet device (MID), a tablet PC, or a netbook. In the embodiment, an operation mode of the electronic apparatus can be determined according to the sensed value corresponding to each sensor trace. Moreover, a power saving mechanism may be applied in the touch-sensitive device.

In the step S410, at least one sensor trace of the touch-sensitive device is scanned with a first frequency to obtain a sensed value corresponding to the sensor trace. Similarly, in some embodiments, the touch-sensitive device may be a capacitive touch-sensitive unit, such as a projected capacitance touch-sensitive unit or a surface capacitive touch-sensitive unit, and the sensed value is a capacitance. In the step S420, it is determined whether the sensed value corresponding to the sensor trace is greater than a first threshold value. When the sensed value corresponding to the sensor trace is not greater than the first threshold value ("No" of the step S420), the method proceeds back to the step S410. When the sensed value corresponding to the sensor trace is greater than the first threshold value ("Yes" of the step S420), it is determined that a first event is detected by the touch-sensitive device, and at least one first application in a first mode corresponding to the first event is executed, as shown in the step S430. In some embodiments, the first event indicates that an object, such as a finger or any conductor, is close to the touch-sensitive device with a distance shorter than a predetermined distance. In the step S440, the sensor trace of the touch-sensitive device is scanned with a second frequency to obtain the sensed value corresponding to the sensor trace. In the embodiment, the second frequency is greater than the first frequency. In the step S450, it is determined whether the sensed value corresponding to the sensor trace is greater than a second threshold value. Note that, the second threshold value is greater than the first threshold value. When the sensed value corresponding to the sensor trace is not greater than the second threshold value ("No" of the step S450), the method proceeds back to the step S420. When the sensed value corresponding to the sensor trace is greater than the second threshold value ("Yes" of the step S450), it is determined that a second event is detected by the touch-sensitive device, and at least one second application in a second mode corresponding to the second event is executed, as shown in the step S460. In some embodiments, the second event indicates that an object, such as a finger or any conductor, touches the touch-sensitive device. Afterward, the method proceeds back to the step S440 to continuously scan the sensor trace of the touch-sensitive device with the first frequency to obtain the sensed value corresponding to the sensor trace. Then, the determination of the step S450 is performed.

In the embodiment of FIG. 4, when it is determined that the object is not close to the touch-sensitive device with a distance shorter than a predetermined distance, the sensor trace of the touch-sensitive device is scanned with a low frequency. When it is determined that the object is close to the touch-sensitive device with a distance shorter than the predetermined distance, the sensor trace of the touch-sensitive device is scanned with a high frequency. Accordingly, the power consumed before the object approaches and touches the touch-sensitive device is lowered.

Figure 5:
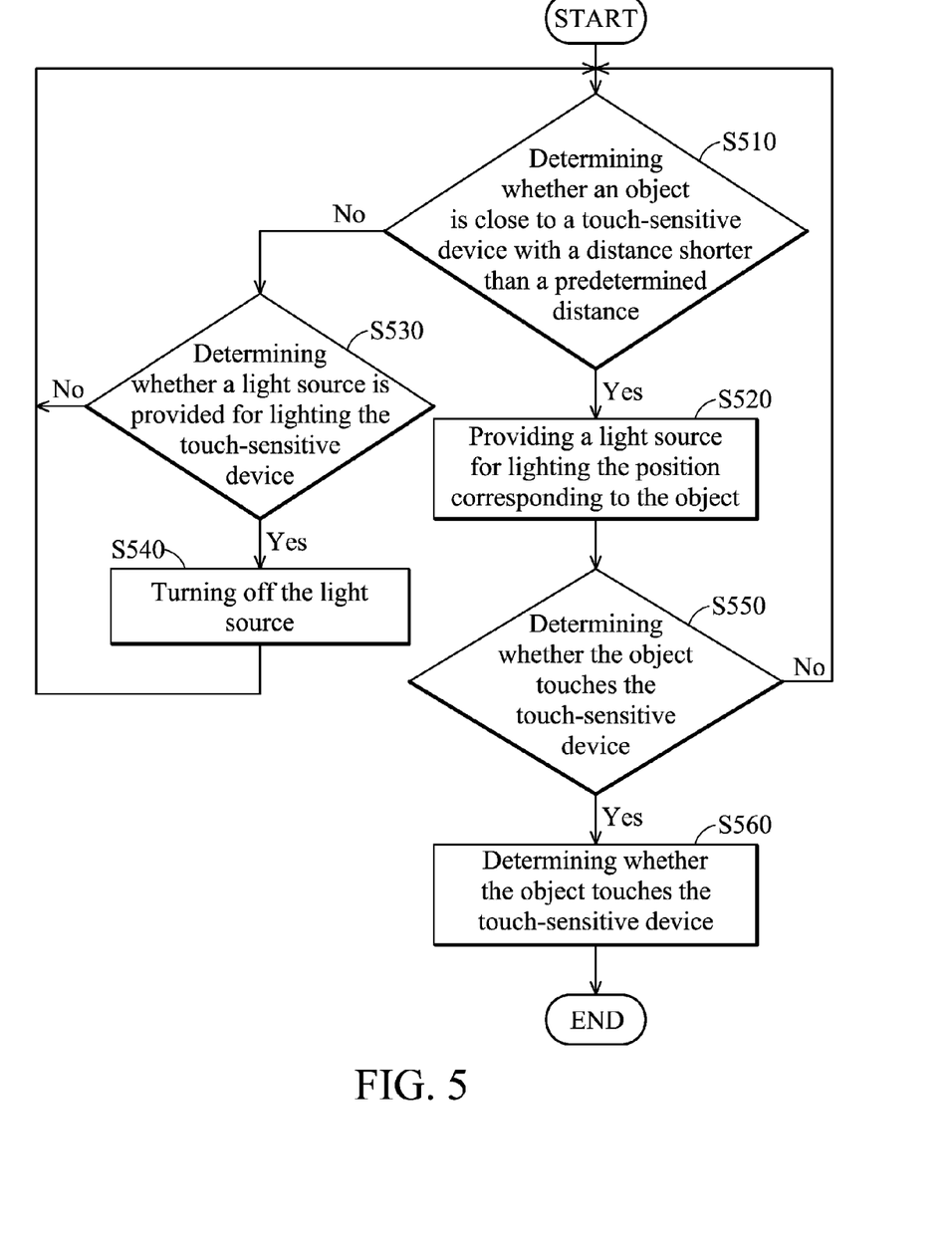
FIG. 5 shows an example of a management and application of an electronic apparatus having a touch-sensitive device.

FIG. 5 shows an example of a management and application method of an electronic apparatus having a touch-sensitive device. In the example, the touch-sensitive device is a capacitive touch-sensitive display unit. When an object is close to the touch-sensitive device with a distance shorter than a predetermined distance, a light source is provided for lighting a small range on the display unit. When the object touches the touch-sensitive device, content corresponding to the position of the object is selected.

In the step S510, it is determined whether an object, such as a finger or any conductor, is close to the touch-sensitive device with a distance shorter than a predetermined distance. Note that, in some embodiment, determining whether an object is close to the touch-sensitive device with a distance shorter than a predetermined distance may be achieved by determining whether a sensed value corresponding to at least one sensor trace of the touch-sensitive device is greater than a first threshold value. When the sensed value is greater than the first threshold value, it is determined that an object is close to the touch-sensitive device with a distance shorter than a predetermined distance. When an object is close to the touch-sensitive device with a distance shorter than a predetermined distance ("Yes" of the step S510), a light source is provided for lighting the position corresponding to the object on the touch-sensitive device (the position at which the sensed value is detected on the sensor trace of the touch-sensitive device), as shown in the step S520. When an object is not close to the touch-sensitive device with a distance shorter than a predetermined distance ("No" of the step S510), it is determined whether a light source is provided for lighting the touch-sensitive device, as shown in the step S530. If there is no light source provided for lighting the touch-sensitive device ("No" of the step S530), the flow proceeds back to the step S510. If a light source is provided for lighting the touch-sensitive device ("No" of the step S530), the light source is turned off as shown in the step S540, and the flow proceeds back to the step S510. In the step S550, after the light source is provided for lighting the position corresponding to the object on the touch-sensitive device, it is determined whether the object touches the touch-sensitive device. In some embodiments, determining whether the object touches the touch-sensitive device can be achieved by determining whether a sensed value corresponding to at least one sensor trace of the touch-sensitive device is greater than a second threshold value. Note that, the second threshold value is greater than the first threshold value. When the sensed value is greater than the second threshold value, it is determined that the object touches the touch-sensitive device. When the object does not touch the touch-sensitive device ("No" of the step S550), the flow proceeds back to the step S510. When the object touches the touch-sensitive device ("Yes" of the step S550), content displayed in the position corresponding to the object is selected or activated.

For example, a finger of a user is close to the touch-sensitive device and is pointing to content which the user desires to select. Though the finger of the user does not touch the touch-sensitive device, there is a light source provided for lighting the position on the touch-sensitive device pointed by the finger, so that the user can view the content which the user desires to select, such as images or text. When the user touches the touch-sensitive device by the finger, the content is selected. In the embodiment, the light source may be provided by a backlight module under the touch-sensitive device.

FIG. 5 shows only one example. In another example, when an object is close to a touch-sensitive display unit, a light source is provided for lighting the position corresponding to the object on the touch-sensitive display unit. When the object touches the touch-sensitive display unit, a light source is provided for lighting all positions of the touch-sensitive display unit. Note that, different applications are provided in modes corresponding to the different events, and the present disclosure is not limited to any application.

Accordingly, via the management and application method and system in the embodiments, an adjacency detection function can be provided in the touch-sensitive device, and different applications are provided in modes corresponding to the different events. Moreover, via the power saving mechanism in the embodiments, the power consumed before the object approaches and touches the touch-sensitive device is lowered.

Methods for screen data management, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A management and application method for an electronic apparatus having a touch-sensitive display device, comprising
    scanning at least one sensing electrode of the touch-sensitive display device with a first frequency to obtain a first sensed value corresponding to the sensing electrode;
    determining whether the first sensed value obtained with the first frequency is greater than a first threshold value and is not greater than a second threshold value;
    when the first sensed value obtained with the first frequency is greater than the first threshold value and is not greater than the second threshold value, determining that a first event, which indicates that an object approaches the touch-sensitive display device with a distance to the touch-sensitive display device shorter than a predetermined distance without touching the touch-sensitive display device, is detected by the touch-sensitive display device, lighting a partial position corresponding to the object on the touch-sensitive display device and scanning the sensing electrode of the touch-sensitive display device with a second frequency to obtain a second sensed value, wherein the second frequency is greater than the first frequency;
    determining whether the second sense value obtained with the second frequency is greater than the second threshold value; and
    when the second sensed value obtained with the second frequency is greater than the second threshold value, determining that a second event, which indicates that the object touches the touch-sensitive display device, is detected by the touch-sensitive display device, lighting all positions on the touch-sensitive display device, and activating or selecting content displayed in the partial position corresponding to the object.

2. The management and application method as claimed in claim 1, wherein a light source is provided for lighting the partial position corresponding to the object on the touch-sensitive display device when the object is close to the touch-sensitive display device with the distance shorter than the predetermined distance.

3. The management and application method as claimed in claim 1, wherein the touch-sensitive display device is a capacitive touch-sensitive display unit, the sensing electrode is a sensor trace, and the first sensed value and the second sensed value are capacitances.

4. A management and application system for an electronic apparatus, comprising:
    a touch-sensitive display device having at least one sensing electrode; and
    a processing unit for scanning the sensing electrode of the touch-sensitive display device with a first frequency to obtain a first sensed value corresponding to the sensing electrode, scanning the sensing electrode of the display touch-sensitive device with a second frequency to obtain a second sensed value corresponding to the sensing electrode, determining whether the first sensed value obtained with the first frequency is greater than a first threshold value and is not greater than a second threshold value, and determining whether the second sensed value obtained with the second frequency is greater than the second threshold value;
    wherein when the first sensed value obtained with the first frequency is greater than the first threshold value and is not greater than the second threshold value, the processing unit determines that a first event, which indicated that an object approaches the touch-sensitive display device with a distance to the touch-sensitive display device shorter than a predetermined distance without touching the touch-sensitive display device, is detected by the touch-sensitive display device, lighting a partial position corresponding to the object on the touch-sensitive display device and scans the sensing electrode of the touch-sensitive display device with the second frequency to obtain a second sensed value; and
    wherein when the second sensed value obtained with the second frequency is greater than the second threshold value, the processing unit determines that a second event, which indicated that the object touches the touch-sensitive display device, lighting all positions on the touch-sensitive display device, and activating or selecting content displayed in the partial position corresponding to the object.

5. The management and application system as claimed in claim 4, wherein a light source is provided for lighting the partial position corresponding to the object on the touch-sensitive display device when the object is close to the touch-sensitive display device with the distance shorter than the predetermined distance.

6. The management and application system as claimed in claim 4, wherein the touch-sensitive display device is a capacitive touch-sensitive display unit, the sensing electrode is a sensor trace, and the first sensed value and the second sensed value are capacitances.

* * * * *